United States Patent
Wang

(10) Patent No.: US 7,864,710 B2
(45) Date of Patent: Jan. 4, 2011

(54) SYSTEM AND METHOD FOR ROUTING SIGNALING MESSAGES IN A COMMUNICATION NETWORK

(75) Inventor: Jin-Gen Wang, Lafayette, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 597 days.

(21) Appl. No.: 11/312,949

(22) Filed: Dec. 20, 2005

(65) Prior Publication Data

US 2007/0140262 A1    Jun. 21, 2007

(51) Int. Cl.
*H04L 12/28* (2006.01)
*H04L 12/56* (2006.01)
(52) U.S. Cl. .................. 370/255; 370/351; 370/401
(58) Field of Classification Search ............. 370/252, 370/254, 255, 351–356, 400, 401
See application file for complete search history.

(56) References Cited

U.S. PATENT DOCUMENTS

| 2003/0120817 A1* | 6/2003 | Ott et al. ................. 709/249 |
| 2004/0114577 A1* | 6/2004 | Sojka et al. .............. 370/352 |
| 2005/0195820 A1* | 9/2005 | Betts et al. ............... 370/392 |
| 2007/0008955 A1* | 1/2007 | Delaney et al. .......... 370/352 |

* cited by examiner

*Primary Examiner*—Hong Cho

(57) ABSTRACT

A system and method for routing signaling messages in a communication network includes an improved route engine having a plurality of dynamically loadable route trees encoded as standardized data files each provisioned for use according to a corresponding network service and having one or more nodes each encoded with logic to independently carry out processing for the service and return a corresponding route response.

16 Claims, 11 Drawing Sheets

SYSTEM AND METHOD FOR ROUTING SIGNALING MESSAGES IN A COMMUNICATION NETWORK

TECHNICAL FIELD

This invention relates generally to communication networks and, more particularly, to a system and method for routing signaling messages in a communication network.

BACKGROUND ART

Referring to FIG. 1, there is shown a schematic diagram of a packet-telephony network, also called an Internet Protocol (IP) network 10. Network 10 may comprise, for example, a fiber layer 12 such as that currently provided by Level 3 Communications, Inc. to drive voice and IP-VPN services on. More particularly, fiber layer 12 is used generally to transport IP packets, and more specifically, to transport voice on top of an IP layer.

Communication network 10 includes one or more computing devices which may be used by a calling party to initiate a voice over Internet Protocol (VoIP) call. Such devices, when used alone, or in combination with other devices as discussed below, function to convert analog audio signals into digital data packets that can be transmitted efficiently over the Internet. Commonly used computing devices include, for example, IP SoftPhones 14, analog telephone adapters 16, and IP phones 18. As those skilled in the art are aware, IP SoftPhones 14 (also called PC SoftPhones) generally comprise one or more application programs resident on a computer. Such applications and services are currently commercially available, for example, from Skype®, Net2Phone®, AOL®, Yahoo® and many other service providers. When used in conjunction with a microphone, speakers and a sound card, the above applications permit a general purpose computer to initiate and receive VoIP calls. Analog telephone adapters (ATA's) 16 (also called terminal adapters) provide the simplest and most common entry point for VoIP service. ATA's 16 allow users to connect a standard analog telephone to a computer or Internet connection such as a Digital Subscriber Line (DSL) modem, cable modem, etc. ATA's function as analog to digital converters which take analog signals from traditional telephones and convert the same into digital packets for transmission over the Internet. Many VoIP providers bundle ATA's free with their service. Finally, IP phones 18 are specialized telephones that look and function to the user as normal telephones with a handset, cradle and buttons. But instead of having standard RJ-11 phone connectors, RJ-45 Ethernet connectors are provided. IP phones 18 include all the necessary hardware and software to generate the required digital data packets. IP phones 18 may connect directly to a router through a wired connection or, in the case of Wi-Fi, through a wireless connection. Session Initiation Protocol (SIP) phones are exemplary IP phones in common use today.

As those skilled in the art will recognize, SIP is a general purpose application-layer control protocol (signaling protocol) which was developed and designed within the IETF (Internet Engineering Task Force). The specification for SIP is available in the form of several requests for comments (RFC's), the most important of which is RFC 3261. RFC 3261 contains the core protocol specification for creating, modifying and terminating sessions with one or more participants. In the case of VoIP, the protocol initiates call set-up, call authentication, call termination and other communication features to endpoints i.e. user agents within an IP domain. SIP is meant to make communication possible. The communication itself (the sounds that are digitized), however, must be achieved by other means (and possibly another protocol). Two protocols that may be used along with SIP are Real Time Transport Protocol (RTP) and Session Description Protocol (SDP). RTP is used to carry real-time multi-media (including audio, video and text) and makes it possible to encode and split the data into packets and transport such packets over the Internet. SDP is similarly used to describe capabilities of session participants. The description is then used to negotiate the characteristics of the session so that all the end devices can participate.

Significantly, SIP is an end-to-end oriented signaling protocol in that all the logic is stored in end devices (with the exception of routing SIP messages as discussed below). State is also stored in end-devices such that there is no single point of failure. This end-to-end design is a significant divergence from the Public Switched Telephone Network (PSTN) where all the state and logic is stored in the network and the end devices—plain old telephone service (POTS) telephones—are primitive. Although SIP is the most commonly used protocol for VoIP applications, it is not the only available or applicable signaling protocol for these applications. Other suitable protocols include, for example, H.323 created by the International Telecommunication Union (ITU) specifically for video conferencing, as well as Media Gateway Control Protocol (MGCP).

Network 10 further includes a plurality of entry or edge devices 20 which function, in accordance with the signaling protocol used, to recognize voice calls (as opposed to data calls) and provide the required interface to and from network 10. In the SIP protocol, for example, such edge devices are referred to generally as edge proxy servers (EPS's). Edge proxy servers are further provided in communication with the SIP core network 22 and, more particularly, with a core proxy server (CPS) 24. As shown, CPS 24 provides an entry point to the core network 22 and includes the intelligence for determining how and where to route voice calls.

Referring still to FIG. 1, IP network 10 may be provided in communication with a PSTN network 26 via a gateway device 28 and media gateway controller (MGC) 30 which together function to convert the Signaling System No. 7 (SS7) and time division multiplexed (TDM) analog signals of the PSTN to SIP and digital data packets and vice versa. PSTN network 26 is, of course, provided in communication with one or more POTS telephones 32 via a network of central offices and serving circuit based switches such as Class 5 switches 33 which are well known to those skilled in the art. Although not shown, network 10 may similarly be provided in communication with other suitable wired or wireless networks either directly via a suitable gateway device or indirectly via the PSTN.

The aforementioned devices that are internal to network 10, i.e. edge proxy servers, core proxy server, media gateway controllers, etc. are referred to generally in the art as "Softswitches" in that they are often logical entities comprising software running on general purpose computing platforms and may be co-located. Regardless of the physical location, these entities together function to independently process and route signaling messages through the network.

Signaling messages in an IP network are generally managed by the core network 22 and, more particularly, by a routing module 34 provided in communication with CPS 24. Although the determination of "how" to process such messages is generally defined and effected by the applicable signaling protocol, e.g. SIP, the initial determination of "where" to route such messages (which edge device) has been left to design choice. Heretofore, conventional systems have utilized hard coded and proprietary routing logic (static sets of process instructions) in conjunction with routing tables stored in relational databases to accomplish this task. Such systems may be understood from a logic flow perspective as comprising multiple layers of "if else" statements which function to handle every call in a prescribed manner based on defined logic. As readily seen, however, such systems may often be wasteful of network resources and time consuming and expensive to update as any changes in the logic require corresponding changes, tests and redeployment of the involved software.

Consequently, a need has developed for an improved system and method for receiving and intelligently routing signaling messages in a communication network such as an IP network. Such a system should utilize standardized data structures and be dynamically loadable and highly scalable so as to minimize network resources and be quickly and easily updated as new products and services become available.

DISCLOSURE OF INVENTION

It is a principal object of the present invention to provide an improved system and method for routing signaling messages in a communication network.

It is a further object of the present invention to provide an improved proxy server for receiving and forwarding such messages in an IP network.

Still further, it is an object of the present invention to provide an improved route engine module for receiving and routing SIP signaling messages in an IP network.

Yet still further, it is an object of the present invention to provide such a route engine module which utilizes independent and dynamically loadable and linkable route nodes wherein the routing logic is encoded as standardized data structures.

In carrying out these and other objects, features and advantages of the present invention, there is provided an improved proxy server for receiving and forwarding signaling messages in a communication network such as, for example, an IP network. The proxy server comprises a route engine having a plurality of dynamically loadable route trees each configured in advance or "on the fly" and provisioned for use in accordance with a corresponding network service. Each route tree further comprises one or more route nodes each encoded with logic in accordance with a standardized set of rules for designing data files, such as, for example, a text format, to independently carry out processing. Each such node is directed to a specific small task and, accordingly, may be separately and independently queried by the route engine to provide a separate response.

In further carrying out the above objects, features and advantages of the present invention, there is provided an improved method for determining where to route signaling messages in a communication network. The method is directed for use with a network host such as, for example, a core proxy server in an IP network which functions to receive and forward SIP signaling messages to and from edge proxy servers, gateway devices, and/or gateway controllers. The method comprises providing a route engine in communication with the network host. As indicated above, the route engine comprises a plurality of route trees each pre-built or dynamically configurable and provisioned for use in accordance with a corresponding network service. Each route tree further comprises one or more route nodes each encoded with logic represented in a standardized data file format such as, for example, Extensible Markup Language (XML), to independently carry out required processing for the service. In keeping with the invention, each route node is directed to a specific small task and may be separately and independently queried by the route engine to provide a separate response. Because the logic in any given node will not affect the logic in another, route trees may be easily configured, reconfigured, deleted, etc. and dynamically loaded in the route engine as new services and enhancements become available. The method further comprises receiving a route request message at the network host, abstracting from the message the applicable network service, and determining or configuring the corresponding route tree. Still further, the method comprises traversing the route tree (and its corresponding route nodes) to carry out the required processing for the network service. Finally, the method comprises returning a route response message to the network host in accordance with the results of the processing.

The above objects, features, and advantages of the present invention are readily apparent from the following detailed description of the best modes for carrying out the invention when taken in connection with the accompanying drawings wherein like reference numerals correspond to like components.

BEST MODES FOR CARRYING OUT THE INVENTION

At the threshold, it is to be understood that the system and method of the present invention is directed for use in any suitable communication network wherein a routing determination is required for signaling messages among network host devices. In a preferred embodiment, as disclosed herein, such a network comprises a packet-telephony network (IP network) and the network host devices are proxy servers which communicate utilizing the SIP signaling protocol. The following detailed description is accordingly provided for exemplary purposes and not intended to limit the scope of the invention to any specific network architecture, host device, signaling protocol or data structure.

Figure 1:
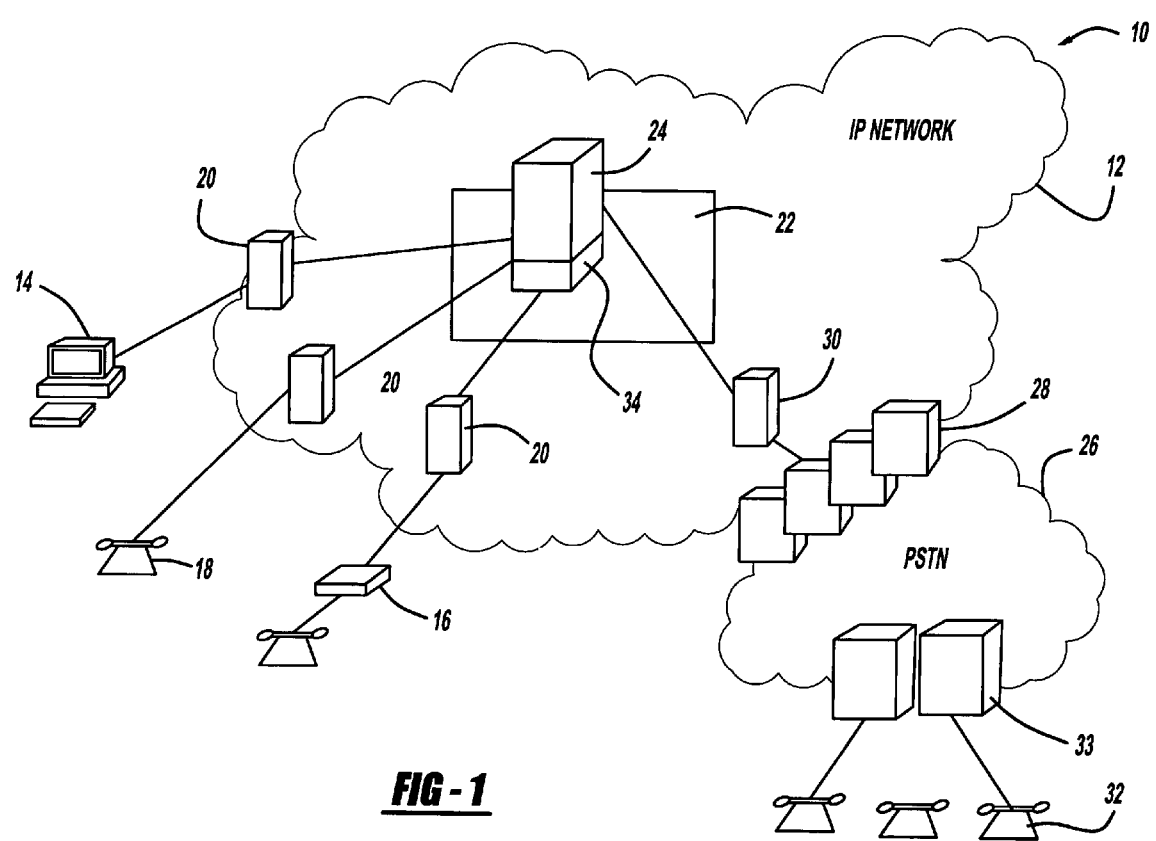
FIG. 1 is a schematic diagram of a packet-telephony network architecture.
Figure 2:
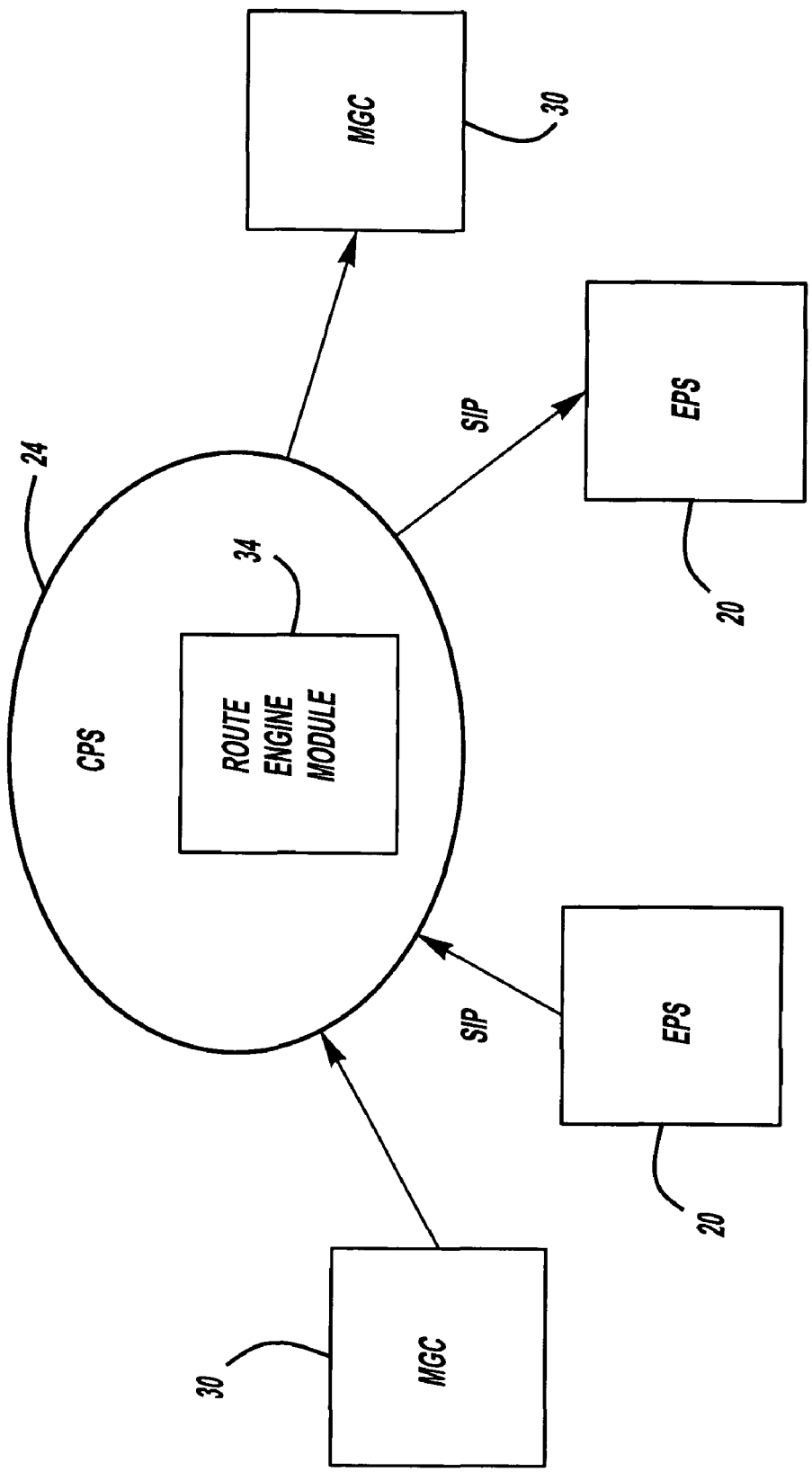
FIG. 2 is a schematic diagram of a core proxy server system operative to receive and forward SIP signaling messages in the IP network of FIG. 1.

Referring again to FIG. 1 of the drawings, an IP network is shown and designated generally by reference numeral 10. As indicated above, a plurality of computing devices 14 are provided in communication with network 10 and, more particularly, the "softswitch" architecture which comprises one or more edge proxy servers which communicate with and terminate in the core network 22. The core network, also called a core proxy server system, includes a core proxy server 24 which functions to receive, process and forward SIP messages to and from edge devices such as edge proxy servers 20 and media gateway controllers 30 as shown generally in FIG. 2.

The Core Network (Core Proxy Server System)

A CPS system is a logical concept, which is comprised of either one type or two types of physically and functionally different SIP proxy servers. These two types of SIP proxy servers are (a) stateful; and (b) stateless. The state within the SIP context refers to a SIP transaction state. A SIP transaction occurs between a client and a server and comprises all messages from the first request sent from the client to the server up to a final response sent from the server to the client. If the request is INVITE and the final response is a non-2xx, the transaction also includes an ACK to the response.

Internet endpoints (edge devices) that use the SIP signaling protocol to find one another and to negotiate a "session" are called user agents. User agents may further be referred to as user agent "servers" and user agent "clients". These are logical entities and each endpoint contains a client and a server. The client is the part of the user agent that sends requests and receives responses. The server is the part of the user agent that receives requests and sends responses. For example, a calling party's user agent functions as a client when it sends an INVITE request and receives responses. Similarly, a called party's user agent functions as a server when it receives the INVITE request and sends responses. However, if the called party elects to send a BYE and terminate the session, the situation changes. Now, the called party's user agent (which sent the BYE) functions as a client and the calling party's user agent functions as a server. As seen, a stateful proxy server maintains a transaction state during the initial call setup, and has the capability to do intelligent routing based on service logic and routing data provisioned by customer tools.

A stateful proxy server comprises two major subsystems: (a) a SIP proxy server subsystem which processes SIP messages according to the standard SIP protocol; and (b) a routing engine subsystem which performs an intelligent routing service. The intelligent routing in the present invention is provided by routing engine subsystem 34 as discussed in detail below.

Stateless proxy servers are generally simple message forwarders which forward messages independent of one another. They can be used as load balancers, message translators and routers. In operation, a stateless SIP proxy server hashes the call ID of each incoming SIP message and uses the hash value to index the outbound proxy servers. Using this hashing mechanism, a stateless proxy server will send all messages with the same call ID to the same outbound proxy server, which is required by a stateful proxy server in order to function correctly when the outbound proxy server is a stateful proxy server. Although messages are usually arranged into transactions as indicated above, stateless proxies do not take care of transactions. Accordingly, stateless proxy servers are high performance systems because they only perform minimal processing tasks.

Stateful proxy servers, in contrast, are far more complex. Upon reception of a request, stateful proxies create a state and keep the state until the transaction finishes. Because stateful proxies have the ability to associate SIP messages into transactions they can perform complex actions including accounting and forking (the ability to send a SIP request to multiple SIP addresses and return the responses to the sender).

Figure 3:
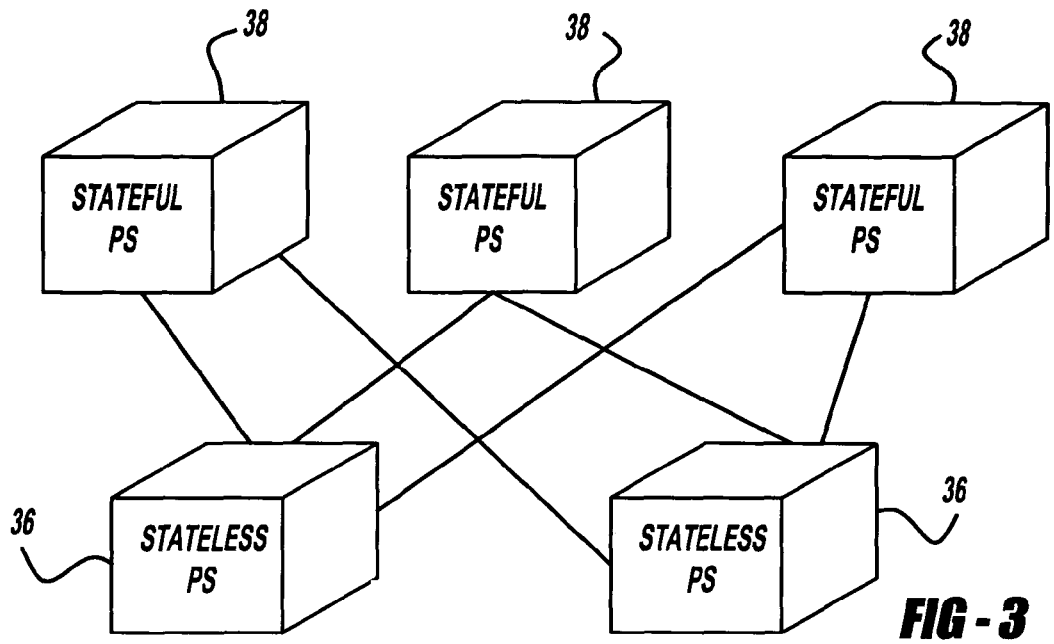
FIG. 3 is a schematic diagram of the architecture of the CPS system of FIG. 2.

The general architecture of a CPS system which may be implemented in accordance with the present invention is shown and described in FIG. 3. Two stateless proxy servers 36 working in hot standby mode are provided in communication with 3 stateful proxy servers 38. At any time, only one stateless proxy server 36 handles all the traffic and load balances across all the three stateful proxy servers 38. The other stateless proxy server sits idle and will take all the traffic when the first stateless proxy server is down. Such hot standby capability can be provided by any suitable software such as, for example, GateD. In operation, the stateful proxy server 38 will dynamically register with its stateless proxy server. A timing or heartbeating mechanism within the stateless proxy server will further dynamically keep track of the availability of each registered stateful proxy server 38. The stateful proxy server will be removed from an available list by its stateless proxy server when it is down and added to an available list when it is up.

Stateful SIP Proxy Server

Figure 4:
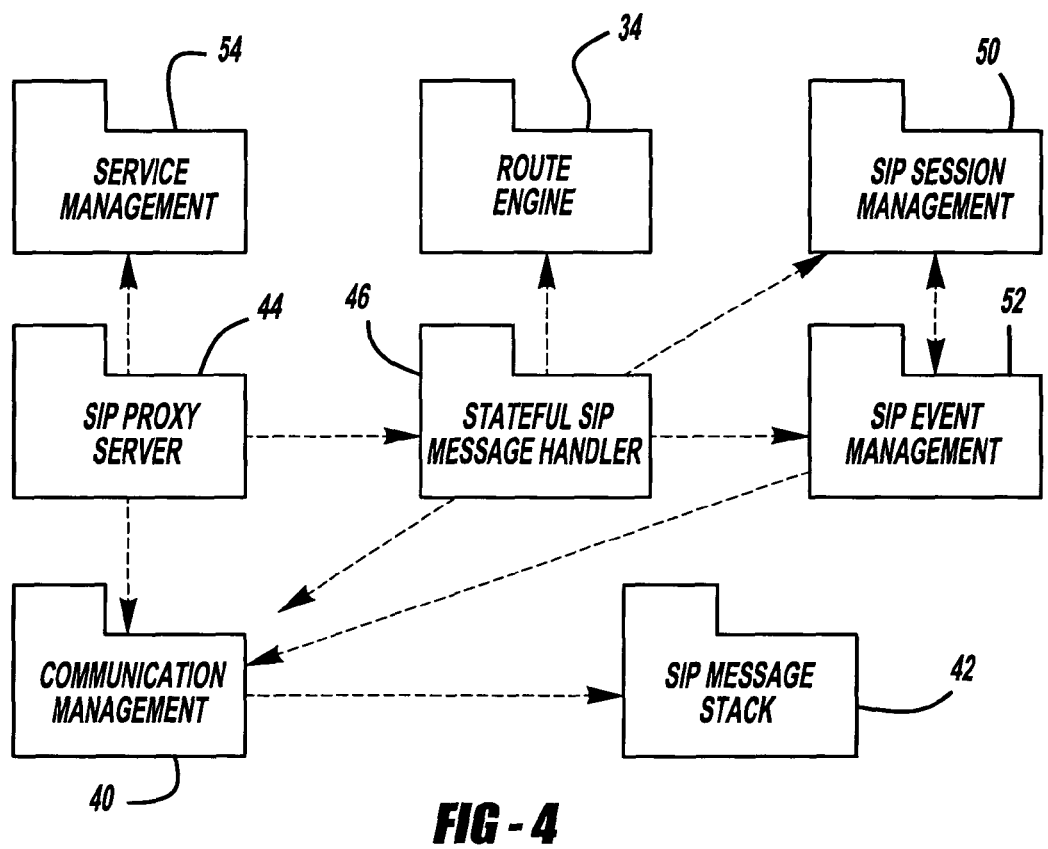
FIG. 4 is a package diagram of the subsystems of a stateful SIP proxy server in the core proxy server system of FIG. 2.

FIG. 4 shows the subsystems of a stateful SIP proxy server 38 which may be used in accordance with the present invention. In operation, the communication management subsystem 40 encapsulates IP communication application programming interfaces (API's) from the application layer and manages the conversion between an IP packet and a SIP message by using the SIP message stack subsystem 42. The SIP message stack parses incoming IP packets to create application layer SIP messages, and converts outgoing SIP messages to IP packets. The SIP proxy server subsystem 44 receives incoming SIP messages and forwards the messages to the SIP handler subsystem 46 for processing. This logic is repeated in an infinite loop. The SIP message handler subsystem 46 makes requests to the route engine 34 when it processes new session initiations and receives routing responses from the route engine. The handler 46 processes the routing responses and routes the messages to appropriate destinations using the SIP session management subsystem 50. The handler 46 also interacts with the SIP event management subsystem 52 to handle message re-transmissions. The route engine 34 processes the route requests and finds the route responses based on the service routing logic and provisioned routing data. The event management subsystem 52 handles SIP message re-transmissions based on the SIP protocol. The SIP proxy server 44 interacts with the service management subsystem 54 to provide an interface for other applications to monitor and control the stateful proxy server system.

Stateless SIP Proxy Server

Figure 5:
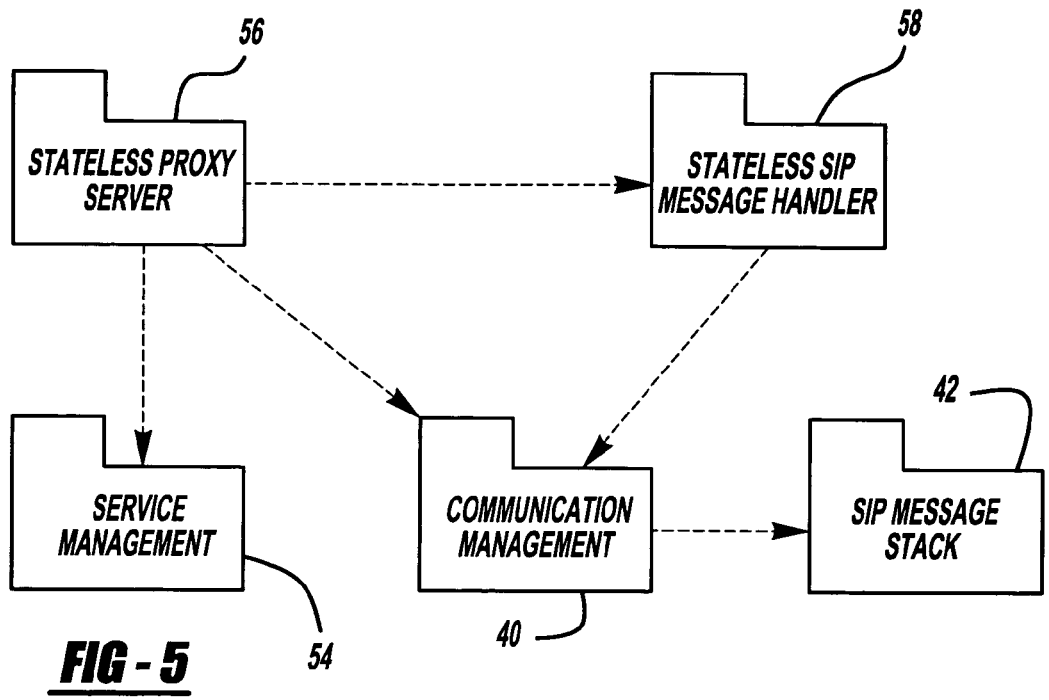
FIG. 5 is a package diagram of the subsystems of a stateless SIP proxy server in the core proxy server system of FIG. 2.

FIG. 5 shows the subsystems of a stateless SIP proxy server 36. Unlike the stateful proxy server 38 discussed above, the stateless proxy server 36 does not include route engine, session state management, or SIP event management subsystems. The stateless proxy server 36 routes each incoming message to a registered SIP proxy server based on the hashing of the call ID. The retransmission of messages for unreliable transport protocols is achieved through upstream and downstream user agents or proxy servers. The communication management and the SIP message stack subsystems 40 and 42, respectively, are the same as in the stateful SIP proxy server. The stateless proxy server subsystem 56 uses the same message processing patterns as in the stateful proxy server. The stateless SIP message handler 58 processes messages without keeping any transaction states. The service management subsystem 54 provides the interface for separate applications to monitor and control the system.

Route Engine

A route engine is a subsystem to find out all possible route choices and the associated costs within the network (here the SIP voice network) based on information in a route request. A route request comprises information extracted from a SIP request message, normally an initial SIP INVITE request message of a new call as discussed above. A routing decision is made according to two types of information: (a) services offered by the network provider (here the voice network); and (b) network and customer data provisioned/updated through external tools. As discussed below, routing service is implemented in a route tree structure consisting of independent route nodes and trunks connecting the route nodes. A routing service is created through a service creation graphical user interface (GUI) tool. The routing data is implemented in route tables consisting of keys and values. The routing data is provisioned via a suitable interface through a distribution center.

Figure 6:
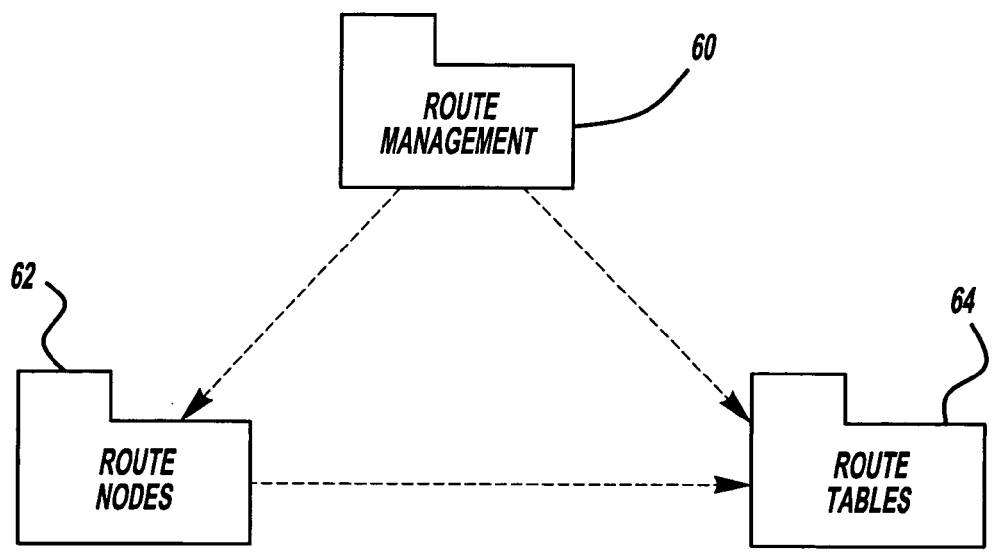
FIG. 6 is a package diagram of a route engine subsystem of a network host device according to the present invention.

FIG. 6 is a package diagram of a route engine in accordance with the present invention. As shown, the route management package 60 manages the route nodes 62 and route tables 64. The route nodes package 62 implements the routing service via route trees 65 discussed below. The route tables package 64 implements routing data that can be provisioned and/or dynamically updated at run time.

Figure 7:
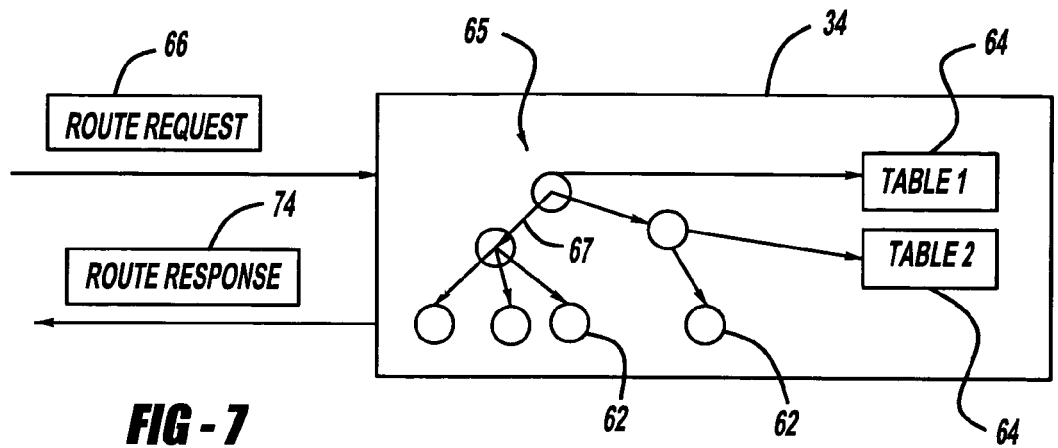
FIG. 7 is a high level block diagram of a route engine subsystem of a network host device according to the present invention.

FIG. 7 shows a high level block diagram of the routing engine subsystem or module 34 used in the stateful proxy server 38 of the core network. As illustrated, a route request 66 (composed from a SIP request message by the stateful SIP message handler subsystem 46) is sent to the route engine 34. The route engine 34 traverses a dynamically loadable routing tree 65, and more particularly, one or more independent route nodes 62 which comprise the route tree 65. The route tree 65 is selected (or dynamically configured) in accordance with a product or service identified in the SIP message as well as information in the system and the tree is traversed to obtain data from one or more tables 64 and return a route response 74 with potential multiple route choices and send back the response 74 to the stateful SIP message handler subsystem 46. This process is illustrated in the flow diagram of FIG. 8.

In keeping with the invention, the process is directed for use in any suitable communication system comprising a host device such as a proxy server which is operative to receive and forward signaling messages. The method includes providing 76 a route engine in communication with the host device comprising a plurality of route trees. Each route tree is provisioned for a selected network service and further comprises one or more route nodes each encoded with logic represented in a standardized data file format, such as a text format, to independently carry out required processing for the service. Each route node is directed to a specific task and may be separately and independently queried by the route engine to provide a separate response. Because the logic in any given node will not affect the logic in another, route trees may be easily configured, reconfigured, deleted, etc. and dynamically loaded in the route engine as new services and enhancements become available.

Figure 8:
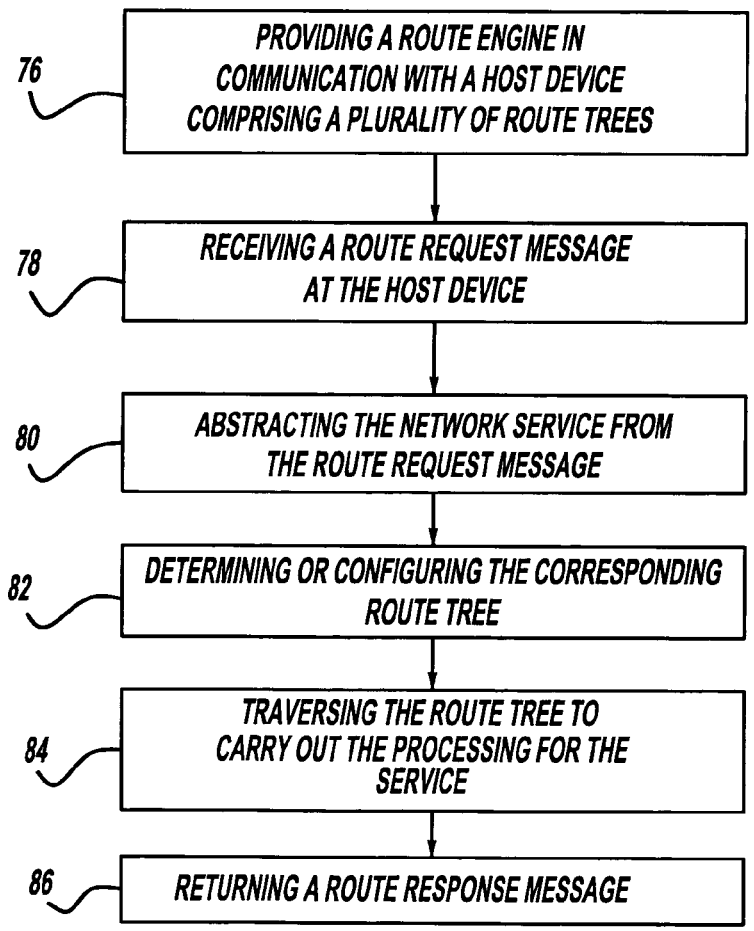
FIG. 8 is a generalized block diagram of the method steps of the present invention for receiving and routing signaling messages in a communication network.

Still referring to FIG. 8, the method further includes receiving 78 a route request message at the host device, abstracting 80 the network service from the route request message, and determining/dynamically configuring 82 the corresponding route tree. Still further, the method comprises traversing 84 the route tree, and more particularly, the route nodes of the route tree, to carry out the processing for the service and returning 86 a route response message to the network host device in accordance with the results of the processing. The details of the provisioning, selection, and traversal of route trees 65 are discussed in further detail below.

Routing Logic Creation

As indicated above, a route request is generated based on the information extracted from a SIP request message whenever a stateful proxy server 38 needs to route the request message. In keeping with the invention, a route request comprises a list of routable elements and is sent to the route engine which, in turn, traverses a route tree using the route request as input. In a first preferred embodiment, a plurality of route trees 65 are pre-built using one or more interconnected route nodes 62 which may be selected from a plurality of available nodes. Each of the nodes is encoded with logic to independently carry out corresponding processing. Again, each route node 62 is directed to a specific task and may be separately and independently queried by the route engine 34 to provide a separate response. Each route tree 65 is assembled and provisioned for use according to a corresponding network service and implemented when such service is identified by route engine 34 from a route request 66. More specifically, the route engine abstracts the required service information from the route request message 66 and identifies and selects for use a corresponding route tree 65. In a second preferred embodiment, an applicable route tree is dynamically configured with the required route nodes 62 selected, linked and provisioned for traversal only upon receipt of the route request message 66 or other suitable time depending on the application and the network design. In either case, the output of the tree traversal is a route response 74, which contains a list of destinations (local edge devices) expressed as IP addresses in SIP-URL. Each destination may further be assigned a priority.

Figure 9:
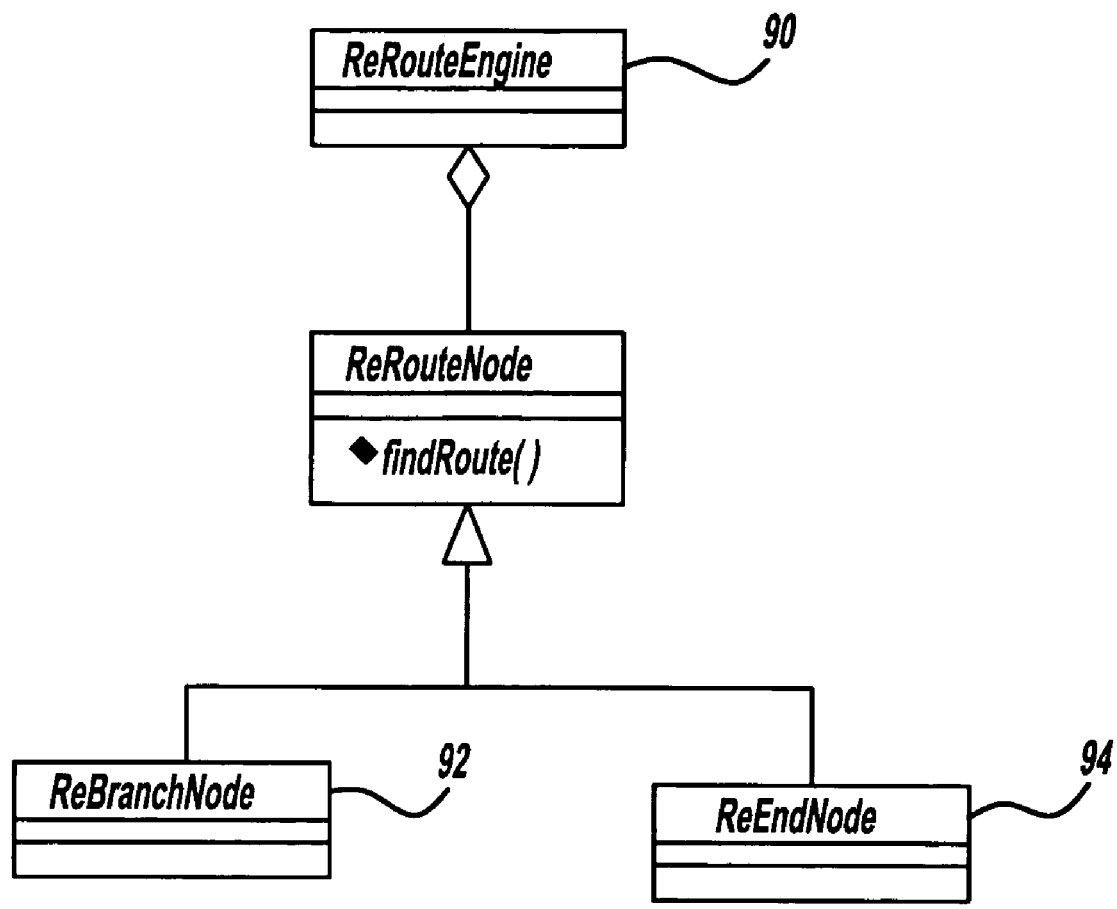
FIG. 9 is a class diagram of a route node in accordance with the present invention.

An exemplary class diagram of a route node may be shown and described with reference to FIG. 9 of the drawings. The ReRoute Engine class 90 contains a pointer to a root node of a route tree. As discussed in further detail below, there are two types of route nodes: (a) branch route nodes; and (b) end route nodes. A branch node has at least one child branch connected to another route node as shown generally in FIG. 9 by the designation ReBranchNode 92. An end route node has no child branch connected to other route nodes as shown generally by the designation ReEndNode 94.

Figure 10:
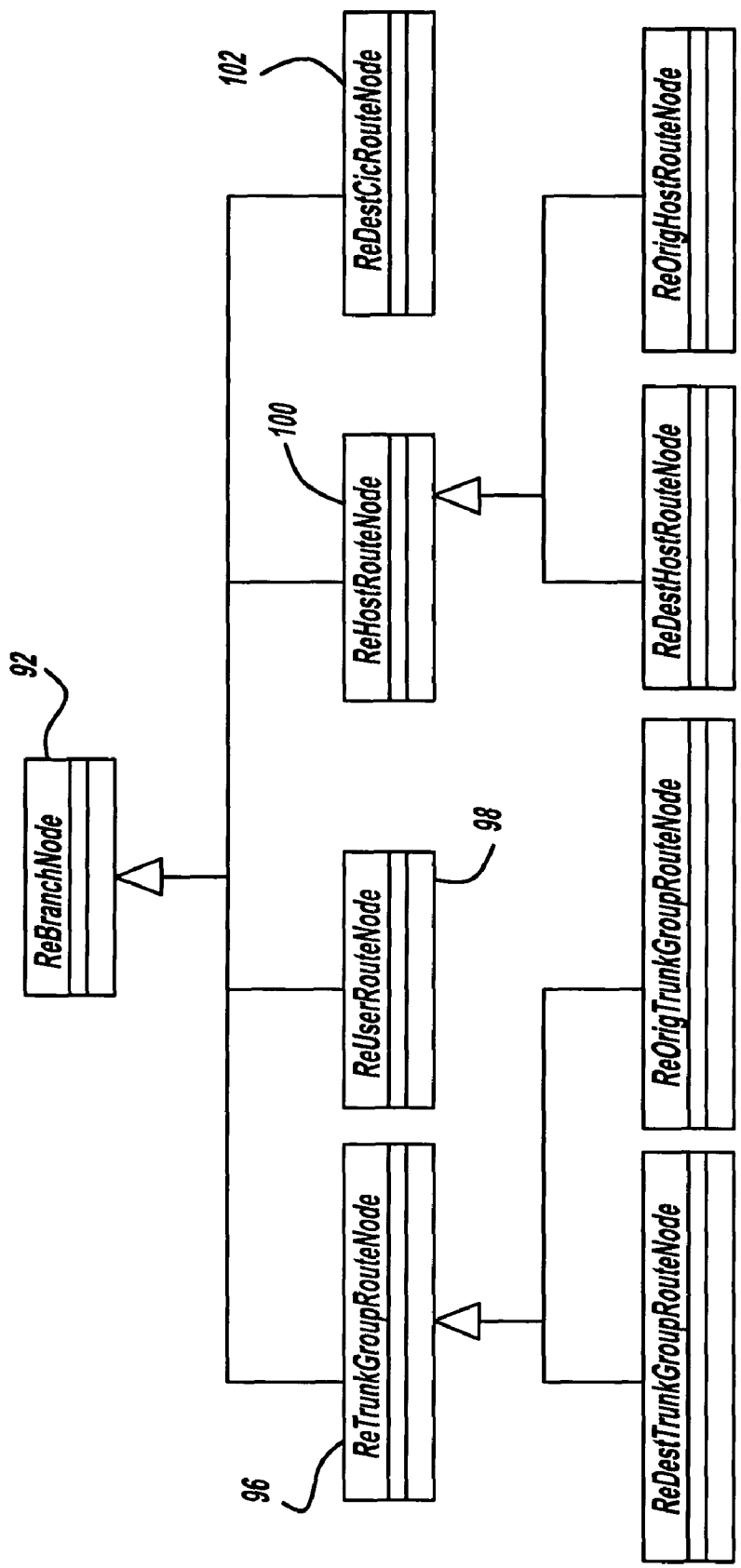
FIG. 10 is a class diagram of exemplary branch nodes to the route node of FIG. 9.

An exemplary class diagram of branch nodes is similarly shown and described with reference to FIG. 10 of the drawings. The classes ReTrunkGroupRouteNode 96 and ReHostRouteNode 100 serve as the base classes for further clarification. The trunk group route node 96 represents the routing logic related to trunk groups. The user route node 98 represents the routing logic related to a user. The host route node 100 represents the logic related to a host. The Carrier Identification Code (CIC) route node 102 represents routing logic related to CIC.

In accordance with the teachings of the present invention, the routing logic in the stateful proxy server is encoded in a standardized data format such as, for example, a text format. In a preferred embodiment, the routing logic is represented by Extensible Markup Language (XML) files. However, it is understood that any suitable data file format may be utilized.

As those skilled in the art will recognize, XML is not a programming language. Rather, it is a framework for defining markup languages and is used principally for structuring data. Accordingly, XML comprises a standardized set of rules or conventions. As its name implies, XML is extensible. It is also fully Unicode-compliant, platform-independent and supports internationalization and localization. Like Hypertext Markup Language (HTML), XML makes use of tags (words bracketed by '<' and '>') and attributes (of the form name="value"). However, there is no fixed collection of markup tags. Thus, a user may define his or her own tags, tailored for specific information. Accordingly, while HTML specifies what each tag and attribute means, and generally further specifies how the text between them will look in a browser, XML uses tags only to delimit pieces of data, and leaves the interpretation of the data completely to the application that reads it. Thus, open source or proprietary software may be used in the route engine 34 of the present invention to interpret the XML data. XML is, of course, a text format and, accordingly, comprises text files that shouldn't have to be read, but which may be read as the need arises.

The routing logic in the stateful proxy server may be represented by three XML files: (a) RouteTree.xml file; (b) TableData.xml file and (c) ReferenceTables.xml file. In operation, a routing decision is made based on two provisioned parts: (1) a routing service, which is expressed in a tree structure identified by a tree name that is an ASCII string; and (2) various route tables, which contain provisioned data and are represented in a table structure. As indicated above, a route tree comprises predefined route nodes 62 and branches 67. A route node is a logic decision element. A branch connects a parent route node to a child route node.

In keeping with the invention, three factors determine the outcome of a route tree traversal using a route request as an input: (1) the information contained in the route request; (2) the types of route nodes in a route tree, which also dictate what route tables will be searched; and (3) the order of the route nodes in a route tree. In a preferred embodiment, the route tree traversal will start from the top route node and end at the bottom route node. There are two types of route nodes: (a) a branch route node that always points to at least one child route node; and (b) an end route node that does not point to any other route nodes. One special branch is referred to as the default branch. Each route node is independent of other route nodes in determining a route response. Accordingly, each route node completes the routing task within the node itself.

There are generally two scenarios for completing a route task: (a) finding a final response, e.g. a destination SIP-URL or a treatment, in an end route node; and (b) adding more information to the route request and delegating the task to its child route node, e.g. in branch route nodes.

Route Trees

Figure 11:
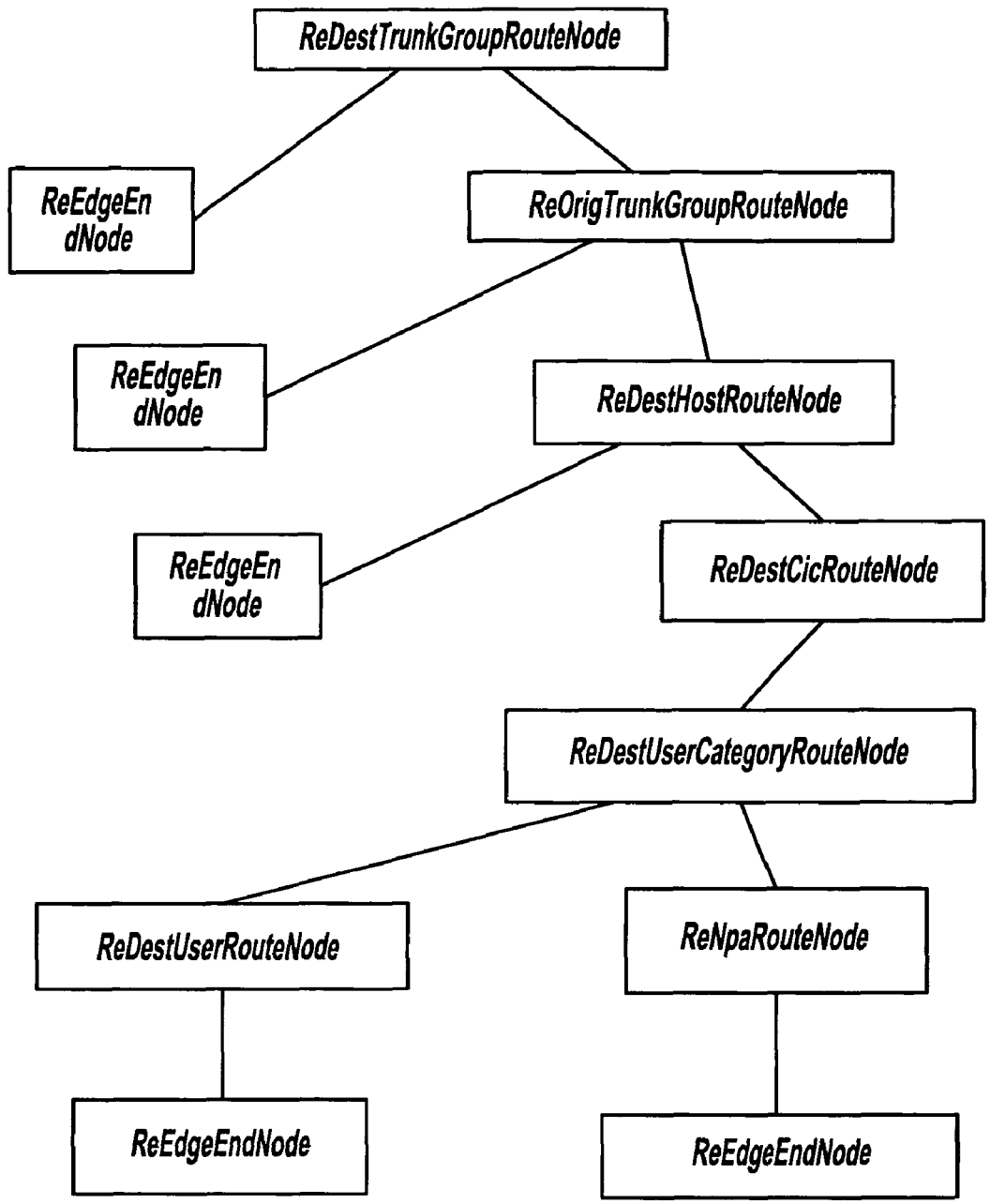
FIG. 11 is an object diagram of an exemplary route tree in accordance with the present invention.

A route tree 65 represents the routing logic used in the route engine and, accordingly, comprises various route node objects connected together based on routing precedence rules. Route trees 65 are created via a suitable service creation tool and preferably in conjunction with an applicable graphical user interface. In operation, a route request 66 traverses the route tree 65 from the root route node to an end route node 94 with the specific order of node traversing determined by the service logic. An object diagram of an exemplary route tree is shown in FIG. 11.

In keeping with the invention, the routing logic of each route tree 65 may be expressed in the file of standard XML format called a RouteTree.xml. In a preferred embodiment, each file has the following elements:

(a) A standard XML version line, <?xml version="1.0" standalone="yes" ?>

(b) Standard XML comments, <!--comment string-->

(c) A new tag called RoutePlanName to represent a route plan. This tab has three attributes: (1) the attribute RoutePlan identifies a route plan name, (2) the optional attribute NodeCount captures the total number of route node objects, and (3) the attribute ChildNode identifies the root route node of the route tree. For example,

```
<RoutePlan RoutePlanName="route_plan_1" NodeCount="10"
   ChildNode="DTGRN_0">
   ...
</RoutePlan>
```

Branch Tags

In addition to the standard XML tags, there may further be defined special tags for route nodes. Each route node may contain zero or more branches. There are three types of branches: index branch, data branch and default branch. Each branch connects two route node objects. One is identified as its parent node and the other is identified as its child node.

IndexBranch tag: Each index branch tag has three attributes: attribute Index identifies the index of the branch, attribute ParentNode identifies the branch's parent node, and attribute ChildNode identifies the branch's child node, for example,

```
<IndexBranch Index="1" ParentNode="DTGRN_0"
   ChildNode="OTGRN_1">
   ...
</IndexBranch>
```

DataBranch tag: Each data branch tag has three attributes: attribute Data identifies the data of the branch, attribute ParentNode identifies the branch's parent node, and attribute ChildNode identifies the branch's child node, for example,

```
<DataBranch Data="720" ParentNode="NRN_1"
   ChildNode="SSEN_2">
   ...
</DataBranch>
```

The DataBranch can also have attribute ReferenceTable instead of Data, for example,

```
<DataBranch ReferenceTable="npa_routing_data"
     ParentNode="NRN_1"
   ChildNode="SSEN_2">
   ...
</DataBranch>
```

DefaultBranch tag: The default branch tag is a specialized index branch with index of "0". Each default branch tag has two attributes: attribute ParentNode identifies the branch's parent node, and attribute ChildNode identifies the branch's child node, for example,

```
<DefaultBranch ParentNode="DTGRN_0" ChildNode="OTGRN_2">
...
</DefaultBranch>
```

Route Nodes and Node Tags

Each route node has its own syntax and semantics. Each route node further completes a particular small routing task independently and is a building block of a route tree as indicated above. Some route nodes are provisioned with global data. By combining different types of route nodes in different order in a route tree, a route engine can be dynamically configured to perform intelligent routing.

Syntactically, each route node is represented by a special XML tag. Each tag has one attribute called NodeID that identifies the route node object. Each node tag may have zero or more branches depending on the type of route node. Numerous types of route nodes may, of course, be used to configure a given route tree depending on the application and the routing service required. Currently available route nodes which may be implemented in accordance with the present invention in one or more route trees in an IP network include, for example the following:

Destination Trunk Group Route Node (DTGRN)

Origination Trunk Group Route Node (OTGRN)

Destination Host Route Node (DHRN)

Origination Host Route Node (OHRN)

Destination User Route Node (DURN)

Origination User Route Node (OURN)

Registered Destination User Route Node (RDURN)

Destination User Pattern Match Route Node (DUPMRN)

Country Code Route Node (CCRN)

Origination Country Code Route Node (OCCRN)

City Code Route Node (CIRN)

Origination City Code Route Node (OCIRN)

NPA Route Node (NRN)

Origination NPA Route Node (ONRN)

NPA-NXX Route Node (NXRN)

Origination NPA-NXX Route Node (ONXRN)

Ten Digit Route Node (TDRN)

Origination Ten Digit Route Node (OTDRN)

Registered Ten Digit Route Node (RTDRN)

Four Digit Route Node (FDRN)

Origination Four Digit Route Node (OFDRN)

Seven Digit Route Node (SDRN)

Origination Seven Digit Route Node (OSDRN)

Local Number Portability Route Node (LNPRN)

Local Number Portability DIP Route Node (LNPDIPRN)

Local Route Number Route Node (LRNRN)

Ported Away Route Node (PAWAYRN)

Percent Allocation Route Node (PARN)

Priority Route Node (PRIRN)

Round Robin Route Node (RRRN)

Day Of Year Route Node (DOYRN)

Day Of Week Route Node (DOWRN)

Time Of Day Route Node (TODRN)

Outbound Route Node (OBRN)

Route Group Route Node (RGRN)

Local Access Transport Areas Route Node (LATARN)

ANI Screening Route Node (ASRN)

Call Blocking Route Node (CBRN)

Destination CIC Route Node (DCRN)

Destination User Category Route Node (DUCRN)

Dial Plan Route Node (DPRN)

NA Number Normalization Route Node (NANNRN)

CNAM Route Node (CNAMRN)

Config Flag Route Node (CFRN)

Parameter Flag Route Node (PFRN)

Product Type Route Node (PTRN)

Proxy Zone Route Node (PZRN)

Test Call Route Node (TCRN)

Check LRN Route Node (CLRN)

Core Proxy End Node (CPEN)

SoftSwitch End Node (SSEN)

Trunk Group End Node (TGEN)

Fully Qualified Domain Name End Node (FQDNEN)

CNAM End Node (CNAMEN)

No Route End Node (NREN)

Forward End Node (FEN)

As readily seen, the permutations of route nodes which may be linked as route trees in different order grows faster than exponential growth. Thus, in keeping with the invention, advanced and sophisticated routing logic for numerous services can be encoded in a small set of route nodes. Encoding all routing logic in a standardized data file format such as XML further simplifies communication routing, and in particular, VoIP routing, and makes the route engine re-usable in many systems and devices including, without limitation, core proxy servers, edge proxy servers, load balance servers, and redirect servers. Moreover, the independence of the route nodes solves the backward compatibility issue when developing new route services because, as disclosed herein, adding new route nodes does not impact the routing logic of existing route nodes.

Figure 12:
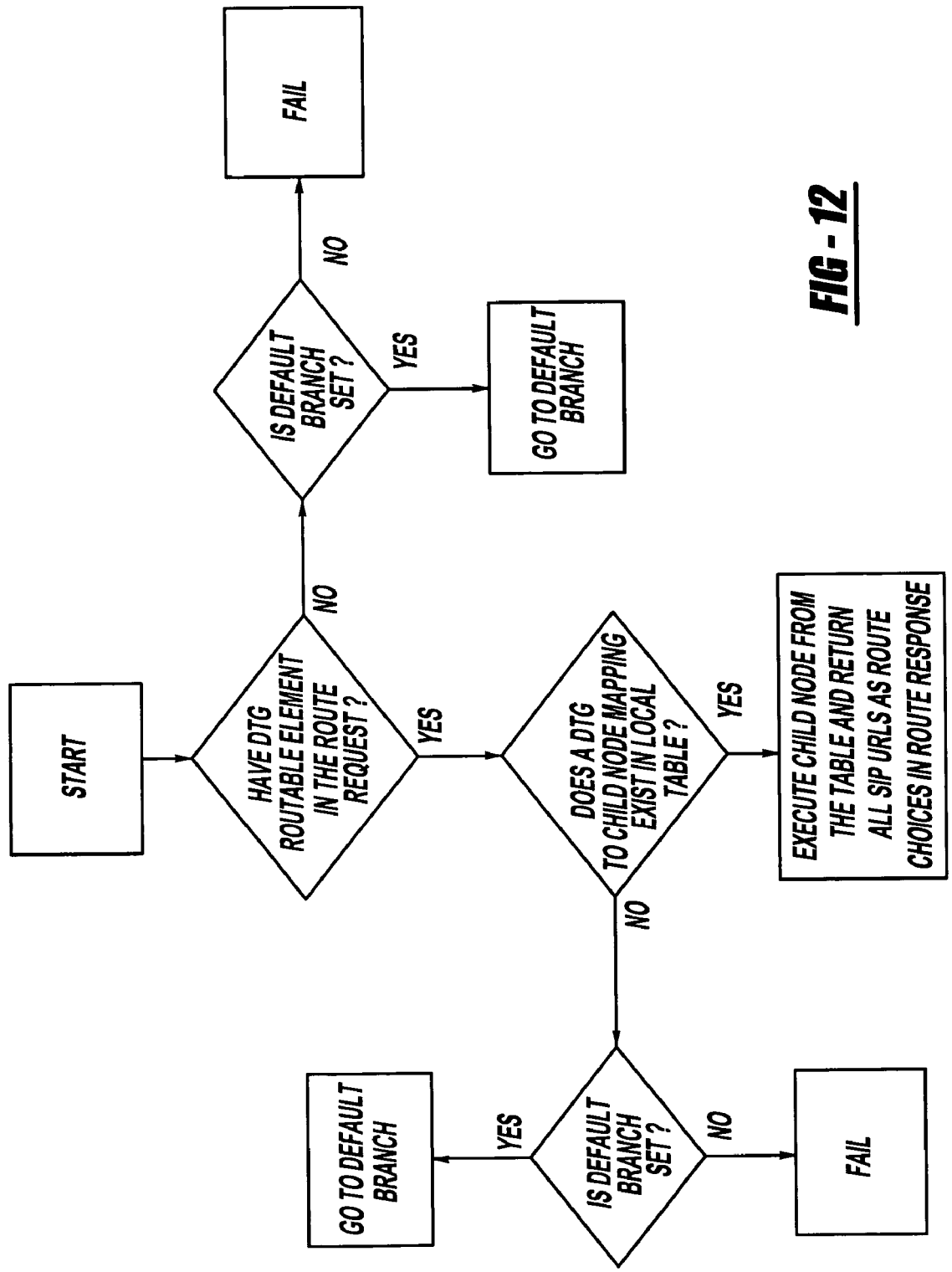
FIG. 12 is a flow diagram of the routing logic of a representative DTGRN route node which may be used to configure a route tree in accordance with the present invention.

With reference to FIG. 12 of the drawings, the Destination Trunk Group Route Node (DTGRN) routing logic is described for exemplary purposes. The DTGRN has a default branch and a local table that contains destination trunk group to child node mapping. A DTG route element is constructed from a SIP-URL parameter DTG in request-uri, e.g. sip+17208882926@10.10.10:5060;DTG=1000. The routing logic is determined as follows: (a) First, check for a DTG routable element in the route request. If the route request doesn't contain a DTG routable element, then delegate the task to its default branch if the default branch is set; otherwise fail the routing if the default branch is not set. (b) If the DTG is present in the route request, check the local table for DTG to child node mapping. If such mapping exists, delegate the routing task to the child node(s) and return all potential SIP-URLs as route choices in the returned route response. (c) If no DTG to child node mapping exists, delegate the routing task to its default branch if the default branch is set; otherwise fail the routing if the default branch is not set.

A DTGRN is represented in a route tree by the tag DTGRN: This tag may contain a default and zero or more data branches. The Data attribute in each data branch lists comma separated DTGs. For example,

```
<DTGRN NodeID="DTGRN_0">
    <DataBranch Data="1000" ParentNode="DTGRN_0"
    ChildNode="RN_1">
    ...
    </DataBranch>
    <DefaultBranch ParentNode="DTGRN_0" ChildNode="RN_2">
    ...
    </DefaultBranch>
</DTGRN>
``` where the DTGRN identifies a destination trunk group route node, and the attribute NodeID identifies this route node object. It contains a data branch that indicates for DTG of 1000 the routing task will be delegated to its child node "RN_1". The default branch points to child node "RN_2". This example can also be represented using a reference table format as follows:

```
<DTGRN NodeID="DTGRN_0">
    <DataBranch  ReferenceTable  ="dtg_routing"
    ParentNode="DTGRN_0"
ChildNode="RN_1">
    ...
    </DataBranch>
    <DefaultBranch ParentNode="DTGRN_0" ChildNode="RN_2">
    ...
    </DefaultBranch>
</DTGRN>
...
<TABLE name="dtg_routing">
    <DATA data="1000"/>
    ...
</TABLE>
```

Figure 13:
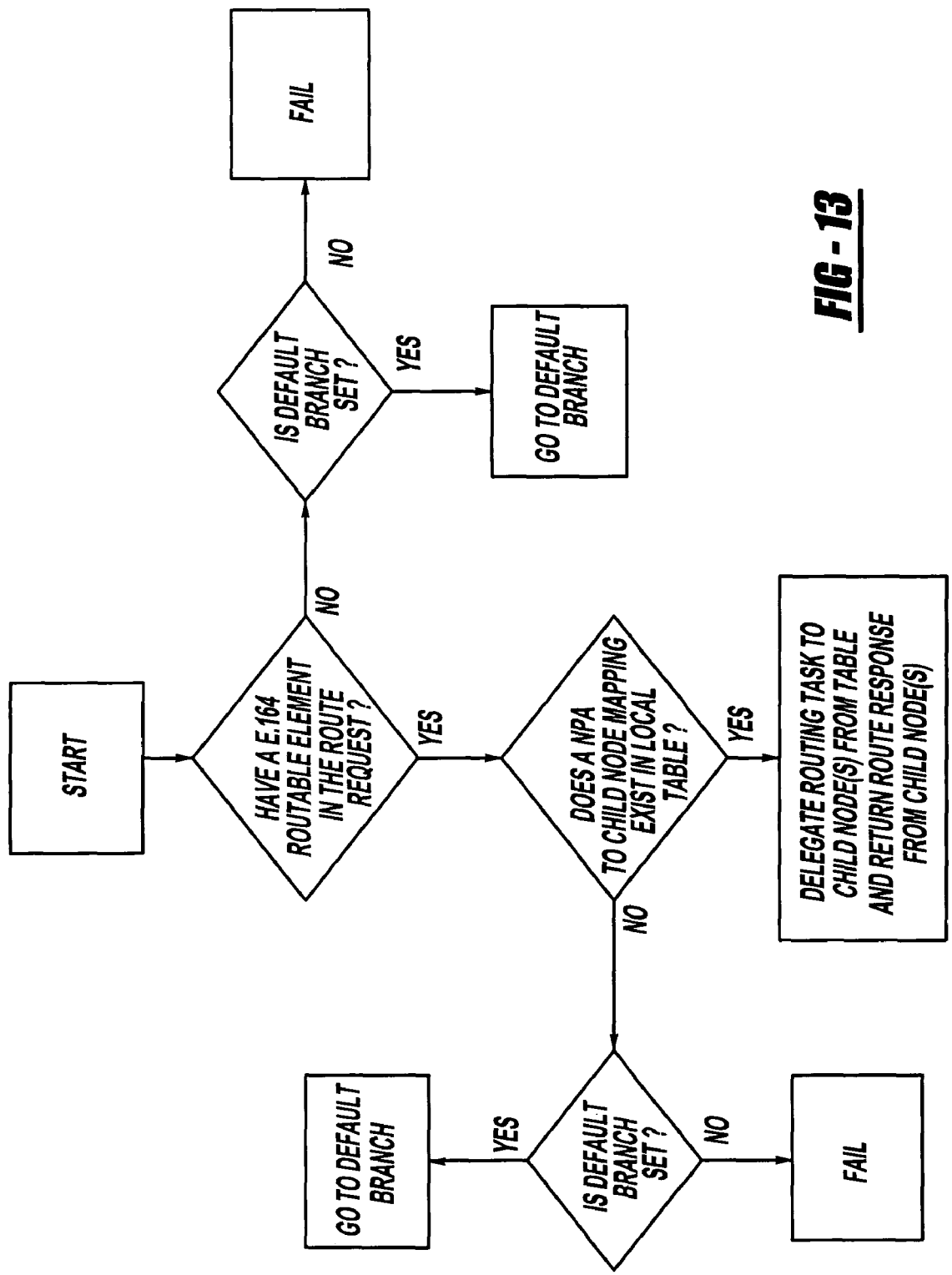
FIG. 13 is a flow diagram of the routing logic of a representative NRN route node which may be used to configure a route tree in accordance with the present invention.

The NPA Route Node (NRN) is similarly described for exemplary purposes with reference to FIG. 13 of the drawings. A NRN is a specialized DURN with routing logic similar to that of a DURN. The NRN is only meaningful for North American Telephone Numbers.

A NRN has a default branch and a local table that contains NPA to child node mapping. A destination user route element in E.164 format may be constructed from the user part in the request-URI, e.g. sip:+17208882926@10.10.10.10:5060, where the destination user is "+17208882926" and the E.164 number is "17208882926" with country code of 1 and NPA of 720. The routing logic is determined as follows: (a) Check for destination E.164 routable element in the route request. If no destination E.164 element is present in the route request, delegate the routing task to the default branch if the default branch is set; otherwise fail the routing if the default branch is not set. (b) If a destination E.164 element is present in the route request, check the local table for NPA to child node mapping. If such mapping exists, delegate the routing task to the child node(s) and return all potential SIP-URLs as route choices in the route response. (c) If no NPA to child node mapping exists, delegate the routing task to its default branch if the default branch is set; otherwise fail the routing if the default branch is not set.

A NRN is represented in a route tree by tag NRN. This tag may contain zero or more data branches. The Data attribute in each data branch lists comma separated NPA's. The wild card "x" or "X" representing the digits from 0 to 9 can be specified in any digit position.

```
<NRN NodeID="NRN_0">
    <DataBranch Data="303, 720, 45x" ParentNode="NRN_0"
    ChildNode="RN_1">
    ...
    </DataBranch>
    <DefaultBranch ParentNode="NRN_0" ChildNode="RN_2">
    ...
    </DefaultBranch>
</NRN>
``` where the tag NRN identifies an NPA route node, and the attribute NodeID identifies this route object. It contains a data branch that indicates for NPA's of 303, 720 and 450 to 459 the routing task will be delegated to its child node "RN_1". The default branch points to child node "RN_2". The above example can also be represented using reference table format as follows:

```
<NRN NodeID="NRN_0">
    <DataBranch   ReferenceTable   ="npa_to_RN_1"
    ParentNode="NRN_0"
    ChildNode="RN_1">
    ...
    </DataBranch>
    <DefaultBranch ParentNode="NRN_0" ChildNode="RN_2">
    ...
    </DefaultBranch>
</NRN>
...
<TABLE name="npa_to_RN_1">
    <DATA data="303"/>
    <DATA data="720"/>
    <DATA data="45X"/>
    ...
</TABLE>
```

Route Tables

Figure 14:
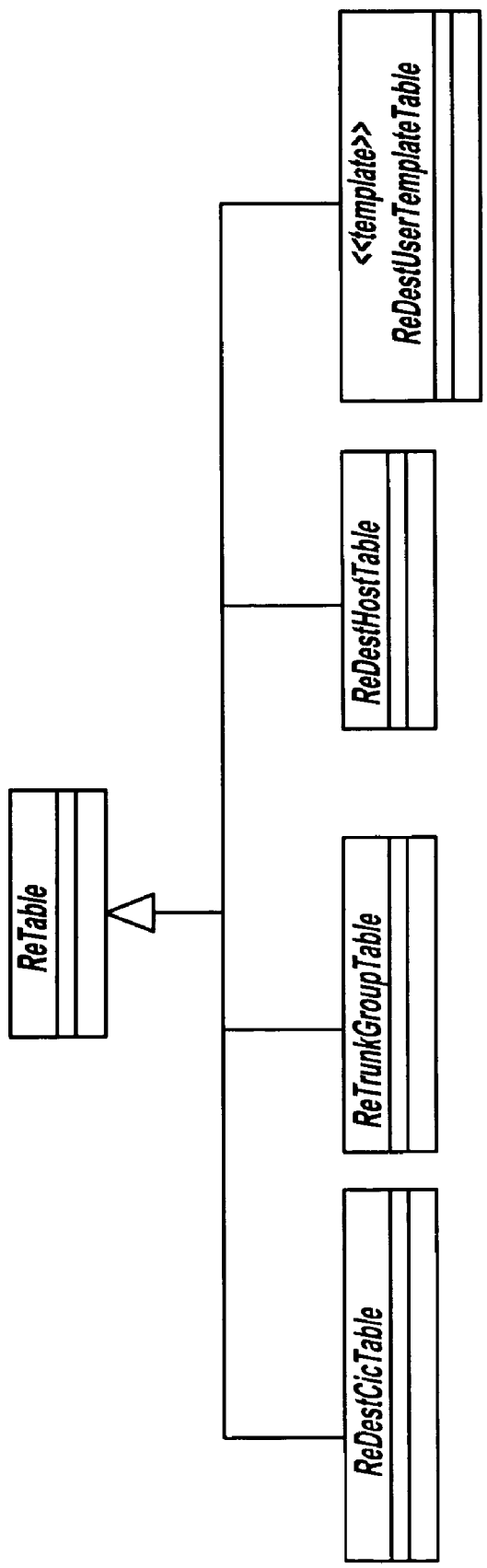
FIG. 14 is a class diagram of exemplary route tables in accordance with the present invention.

In further keeping with invention, the disclosed route tables may in a preferred embodiment contain provisioned global data for routing. The data is "global" in that there is only one instance of such data in a single application. Each route table is therefore provisioned independently. An exemplary class diagram of route tables is shown in FIG. 14 of the drawings. All route tables are included in a single file called Table-Data.xml. The order of tables in the file is not critical. One or more tables can be removed from the file if they are not needed. The file is specified in a standard XML format, which will have the following elements:

(a) A standard XML version line, <?xml version="1.0" standalone="yes" ?>

(b) Standard XML comments, <!--comment string-->

(c) A new tag called ROUTING_DATA to capture all the provisioned tables.

(d) In addition to the standard XML tags, special tags may also be defined for provisioned tables, including, for example:

DESTHOST_TO_CIC tag for a table of destination host to destination CIC mapping;

PORTED_AWAY tag for the table of ten-digit number blocks ported away from carrier A to carrier B where either carrier A or carrier B could be in the IP network;

ANI tag for the table of originating ANI blocks.

NPA_NXX_TO_LATA tag for a table of NPA_NXX to LATA and rate center (RC) mapping.

LOCAL_SP2 tag for a table of NPA-NXXs classified as SP2 region.

LOCAL_RC tag for a table of calling number rate center to called number rate center mapping that classifies a local call.

CUSTOMER_CALL_LIMIT tag for a table of customer call limits.

Reference Tables

The reference tables may similarly contain provisioned local data for routing, where local means there may be multiple tables of similar data, e.g. multiple ten-digit tables. All the reference tables are included in a single file called ReferenceTables.xml. The order of the tables is again not critical. The file is specified in a standard XML format which will have the following elements:

(a) A standard XML version line, <?xml version="1.0" standalone="yes" ?>

(b) Standard XML comments, <!--comment string-->

(c) A new tag called REFERENCE_TABLES to capture all the provisioned tables.

(d) In addition to the standard XML tags, special tags may also be defined for provisioned tables, including, for example, a TABLE tag for each table. Each TABLE tag has an attribute called $_{name}$ that identifies the table. Each table only has empty elements called DATA with certain attributes depending on the type of table.

It is understood that short reference tables can, of course, be included in route tree XML files without departing from the invention. There is no semantic difference to include a reference table in a route tree XML file or in a reference table XML file.

Route Examples

By way of example, assume a RouteTree.xml file has the following lines:

```
<?xml version="1.0" standalone="yes" ?>
<RoutePlan RoutePlanName="npa_route_plan_1" NodeCount="3" ChildNode="NRN_0">
    <NRN NodeID="NRN_0">
        <DataBranch Data="720" ParentNode="NRN_0"
        ChildNode="EEN_1">
            <EEN NodeID="EEN_1" SipURL="sip: 10. 10. 10. 10:
            5060" />
        </ DataBranch>
        <DataBranch Data="303" ParentNode="NRN_0"
        ChildNode="EEN_2">
            <EEN NodeID="EEN_2" SipURL="sip: 20. 20. 20. 20:
            5060" />
        </ DataBranch>
    </ NRN>
</ RoutePlan>
```

In this case, all calls with NPA of 720 will be routed to 10.10.10.10:5060 (edge end node). All calls with NPA of 303 will be routed to 20.20.20.20:5060 (edge end node). All calls with other NPAs will fail because the default branch is not set.

As a further example, assume a RouteTree.xml file has the following lines:

```
<?xml version="1.0" standalone="yes" ?>
<RoutePlan RoutePlanName="npa_route_plan_2" NodeCount="4" ChildNode="NRN_0">
    <NRN NodeID="NRN_0">
        <DataBranch Data="720" ParentNode="NRN_0"
        ChildNode="EEN_1">
            <EEN NodeID="EEN_1" SipURL="sip: 10. 10. 10. 10:
            5060" />
        </ DataBranch>
        <DataBranch Data="303" ParentNode="NRN_0"
        ChildNode="EEN_2">
            <EEN NodeID="EEN_2" SipURL="sip: 20. 20. 20. 20:
            5060" />
        </ DataBranch>
        <DefaultBranch ParentNode="NRN_0"
        ChildNode="CPEN_3">
            <CPEN NodeID="CPEN_3" SipURL="sip: 30. 30. 30. 30:
            5060" />
    </ NRN>
</ RoutePlan>
```

In this case, all calls with NPA of 720 will be routed to 10.10.10.10:5060 (edge end node). All calls with NPA of 303 will be routed to 20.20.20.20:5060 (edge end node). All calls with other NPAs will be routed to 30.30.30.30:5060 (core proxy end node) because the default branch is set to CPEN with that address.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. For use in an IP network comprising a core proxy server operative to receive and forward SIP signaling messages, a method for determining a route for said messages, comprising:

providing a route engine in communication with the core proxy server, the route engine comprising a plurality of route trees, each route tree provisioned for a selected network service and each route tree further comprising one or more nodes each encoded with logic in XML file format to independently carry out required processing for the service;

receiving a route request message at the core proxy server;

abstracting from the route request message the selected network service;

determining the corresponding route tree;

traversing the route tree to carry out the processing for the selected service; and returning a route response message to the core proxy server in accordance with the results of the processing.

2. A method as in claim 1, wherein the plurality of route trees are dynamically loadable.

3. A method as in claim 1, wherein the logic comprises standardized data structures.

4. For use in an communication network comprising a proxy server operative to receive and forward signaling messages, a method for determining a route for said messages, comprising:

providing a route engine in communication with the proxy server, the route engine comprising a plurality of route trees encoded as corresponding text files, each route tree provisioned for a selected network service and further comprising one or more nodes each encoded with logic to independently carry out required processing for the service;

receiving a route request message at the proxy server;

abstracting from the route request message the selected network service;

determining the corresponding route tree;

traversing the route tree to carry out the processing for the selected service; and returning a route response message to the proxy server in accordance with the results of the processing.

5. A method as in claim 4, wherein the communication network is an IP network.

6. A method as in claim 4, wherein the signaling messages are SIP messages.

7. A method as in claim 4, wherein the text files are XML files.

8. A method as in claim 4, wherein the plurality of route trees are dynamically loadable.

9. A method as in claim 4, wherein the logic comprises standardized data structures.

10. A system for use in a communications network, the system comprising:

a proxy server operative to receive and forward signaling messages;

a route engine in communication with the proxy server, the route engine comprising a plurality of route trees encoded as corresponding text files, each route tree provisioned for a selected network service and further comprising one or more nodes each encoded with logic to independently carry out required processing for the service;

wherein in receipt by the proxy server of a route request message, the proxy server is configured to forward the route request message to the route engine, and in receipt of the route request message from the route server, the route engine is configured to ascertain the selected network service from the route request message, determine the corresponding route tree, traverse the route tree to carry out the processing for the selected service, and return a route response message to the proxy server in accordance with the results of the processing.

11. A system as in claim 10, wherein the communication network is an IP network.

12. A system as in claim 11, wherein the signaling messages are SIP messages.

13. A system as in claim 10, wherein the route trees are dynamically loadable.

14. A system as in claim 10, wherein the logic comprises standardized data structures.

15. A system as in claim 10, wherein the proxy server is a core proxy server.

16. A system as in claim 10, wherein the text files are XML files.

* * * * *